FLOWMETER FOR USE IN MONITORING OXYGEN UPTAKE

Filed Oct. 10, 1967

INVENTORS
ANTHONY J. BARAK
HARRIET C. BECKENHAUER
RICHARD A. MYERS &
ROY N. WILGER
BY
ATTORNEY

United States Patent Office 3,516,292
Patented June 23, 1970

3,516,292
FLOWMETER FOR USE IN MONITORING
OXYGEN UPTAKE
Anthony J. Barak, Harriet C. Beckenhauer, Richard A. Myers, and Roy N. Wilger, Omaha, Nebr., assignors to the United States of America as represented by the Administrator of Veterans Affairs and/or the Secretary of the Army
Filed Oct. 10, 1967, Ser. No. 674,352
Int. Cl. G01f 3/36
U.S. Cl. 73—221                                    7 Claims

ABSTRACT OF THE DISCLOSURE

This invention relates to an automatic, continuous flow, flowmeter for accurately measuring liquid flow rate. Specifically, the flowmeter includes the use of alternate filling channels having a predetermined, equal volume, and electro-optically actuated switching valves designed so that one channel empties while another fills. The flow rate is then measured by counting over a measured length of time the number of switches made which is the number of times the channels fill and empty. It will be obvious from the following discussion that the inherent accuracy of the flowmeter hereinafter disclosed will also promote a wide variety of other uses in laboratory and clinical testing.

---

This invention may be manufactured and used by or for the Government for governmental purposes without the payment to us of any royalty thereon.

BACKGROUND OF THE INVENTION

(1) Field of the invention

This invention broadly pertains to automatic, continuous flow, flowmeter for uses which depend upon a highly accurate flow measurement, such as for use in measuring the oxygen consumption in blood. More particularly the flowmeter may be used to measure the volumetric flow of blood in a system for measuring the oxygen consumption as a test of the viability of an isolated, perfused liver.

(2) Description of the prior art

A critical problem confronting investigators in the field of organ perfusion is that of determining the viability of the organ. Although previous studies have been made involving the oxygen consumption in perfused livers, many experimentors use the bile flow or appearance of the liver as an index of viability. It has been discovered that the oxygen consumption is a highly reliable indicator of viability. However, in order to measure the oxygen consumption an extremely accurate continuous flow, flowmeter is needed as an improvement to conventional oxygen measuring apparatus. It is essential to the investigation of oxygen consumption in blood, as a parameter of organic viability, that a meter be used capable of presenting the total flow volume for any given period.

SUMMARY

The invention specifically lies in the automation for continuous flow of a dual channel flowmeter. As one channel fills a central metering chamber also fills. The filling of metering chamber causes a float to rise in a U-shaped trap which communicates with the upper portion of the metering chamber. Contamination of the liquid to be metered is prevented by separating the liquid supporting the float from the liquid in the metering chamber by an air lock.

When the float rises to a predetermined position it interrupts a photoelectric circuit which opens the emptying valve to the filled channel and the metering chamber and routes the fluid into the alternate channel which also flows into the metering chamber repeating the above described cycle.

This system provides an accurate measure of total flow at any given time after a calibration designed to evaluate the volume expelled after each channel is emptied.

Accordingly, it is an object of this invention to provide an accurate flowmeter measuring, continuously, total flow.

It is another object to provide a flowmeter for the measurement continuously of total flow without contamination of the flowing liquid.

It is a further object to modify conventional apparatus used to measure blood oxygen consumption to include an economical and highly accurate total flowmeter.

These and other objects will become apparent with reference to the following drawings and description:

DESCRIPTION OF THE PREFERRED EMBODIMENT

Figure 1:
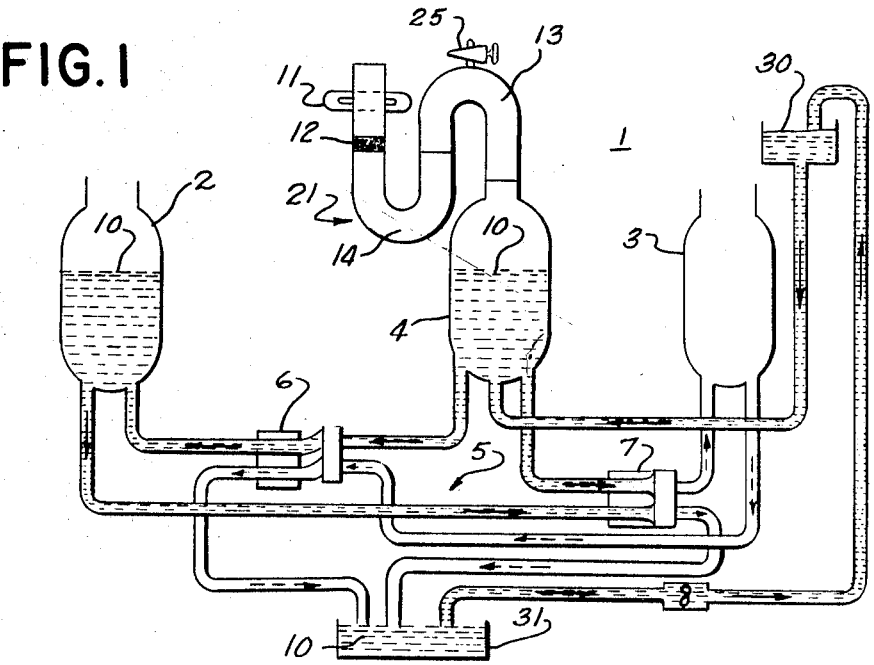
FIG. 1 shows the flowmeter of this invention in a liver perfusion system metering the flow of blood between a reservoir and an isolated liver.

The flowmeter 1, includes columns 2 and 3 and a central chamber 4. The columns and chamber are interconnected with tubing 5, through solenoids 6 and 7, which act on gate valves, opening and closing alternatively, to form the dual channels with tubing, 5, so that one column fills as the other empties.

Figure 2:
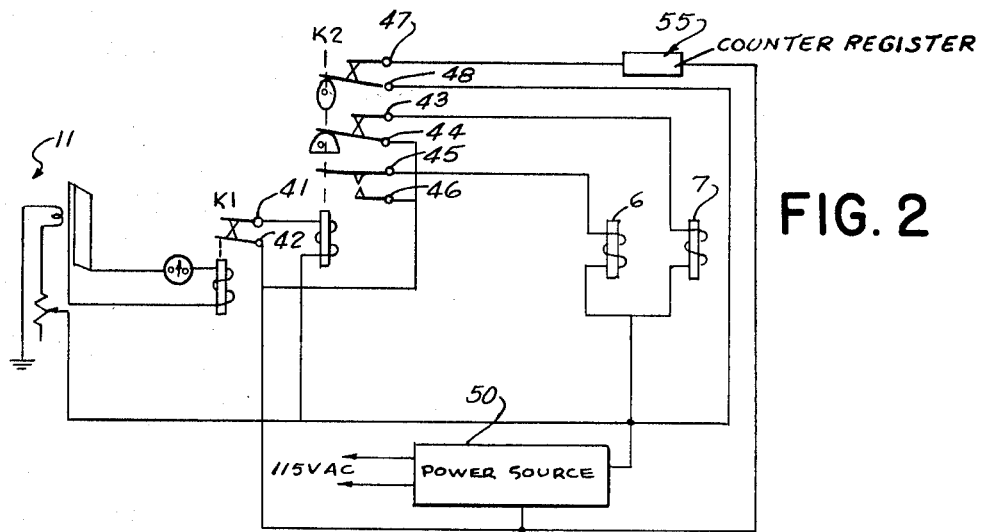
FIG. 2 shows the electric schematic of the blood flow counter.

The electrical system of FIG. 2 is arranged so that the solenoids regulate the flow through their respective valves. When the solenoid is deenergized, its valve opens allowing the flow of a liquid 10, such as blood, through the tubing.

In FIG. 1, arrows trace the flow system of the meter 1, when solenoid 6 is closed and 7 open. Phantom arrows trace the alternate path when solenoid 6, is open and 7 is closed.

Solenoid valves 6 and 7 are controlled through photocell 11, coacting with float 12. As liquid 10, flows into chamber 4, and column 2, from test organ 30, a level differential develops between the level of liquid 10, in the column and the chamber. The differential results in an increase in pressure within the chamber 4, which acts to compress the air 13, in trap 21. The increased pressure on the water 14 causes the float 12 to rise. When float 12 interrupts the light source of photocell 11, the counter is tripped and simultaneously solenoid 6 is opened and 7 closed. This allows column 2 to empty and cycles the flow of liquid 10 through chamber 14 into column 3.

Stop cock, 25, on trap, 21, is used to regulate the volume of air, 13, in trap, 21. The compressibility of air, 13, is related to the volume of liquid, 10, which will flow into a column before the float, 12, interrupts photocell, 11, and the column is emptied. During preliminary calibration the stop cock, 25, may be opened selectively to insure a desired filling level of liquid in the column before the emptying phase begins and the alternate column fills.

In this manner, flow can be continually measured with no restriction placed, for example, on the blood, 10, leaving the liver, 30. Blood is pumped from the reservoir, 31, to an oxygenator, 32, and then flows by gravity to the liver, 30. Blood, 10, leaving the liver, 30, flows by gravity to chamber, 4. Blood, 10, cannot be used to interrupt the photocell, 11, because the heat of the lamp coagulates the blood.

When the blood, 10, rises in column, 2, and in chamber, 4, to its preselected high point where float, 12, interrupts the photocell, 11, the current in relay, K1 of FIG. 2 drops to zero. When K1 deenergizes closing contacts, 41, and 42, racket impulse relay K2 energizes from, for example, a 12-volt power supply, 50, closing contacts, 45, and 46, and opening contacts, 43, and 44, simultaneously. This permits column, 2, to drain through the open gate valve of solenoid, 7. As solenoid valve, 7, opens, solenoid valve, 6, closes. Column, 3, then fills through the open valve of solenoid, 7.

When column, 3, is filled and the liquid, 10, in chamber, 4, causes float, 12, to interrupt photocell, 11, solenoid, 6, is opened, permitting column, 3, to drain. The level of liquid, 10, in chamber, 4, drops momentarily when a valve is opened and allows the float, 12, to fall from the optical path of photocell, 11 which in turn initiates the filling of the alternate column.

Each time the photocell, 11, is interrupted and the racket relay pulses, contacts, 47 and 48, of K2 close momentarily sending a pulse to advance a conventional counter register, 55. If columns 2 and 3 are of an equal, known volume, the number of counter pulses registered over a given period of time may be readily used to calculate the average flow rate.

Figure 3:
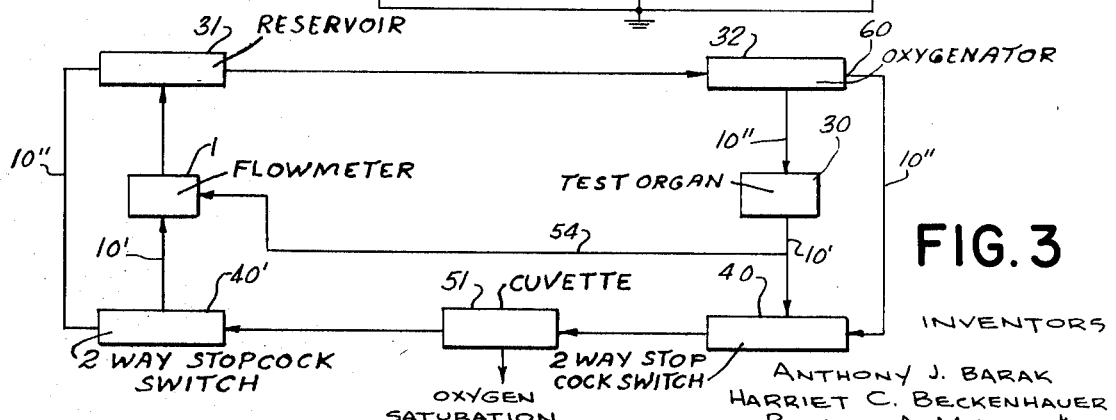
FIG. 3 is a schematic showing the linkage of liver perfusion apparatus with elements for oxygen saturation measurements.

The flowmeter of this invention may be used in the liver perfusion apparatus of FIG. 3. This apparatus with the exception of the flowmeter is essentially that described by Miller et al. in 95 J. Exptl. Med., 431–453 (1951).

The venous blood, 10′, drains from the superior vena cava and has a flow rate varying from 20 to 30 ml./min. This blood is passed through a two-way stopcock switching system, 40, which allows either of two blood channels to be used. It is usually positioned to channel the venous blood to the cuvette, 51, for oxygen saturation determination according to the photometric method of Wood and Geraci described in 34 J. Lab. Clin. Med. 387–401 (1949). The cuvette used allows a passage of 20 ml./min. which necessitated a bypass or shunt, 54, to carry the excess venous blood flow, 10′, to the flowmeter, 1, for measurement and then to the reservoir, 31.

A small outlet, 60, in the side of the blood-collecting section of the oxygenator, 32, allows manually controlled, periodic passage of arterial blood, 10″, through the cuvette, 51, by way of the switching system, 40. While arterial oxygen saturation measurements are made, the venous blood is shunted by means of the bypass, 54, to the flowmeter, 1. Blood leaving the cuvette is channelled to another two way stopcock switch, 40′. If venous oxygen saturation is measured, the blood is shunted by switch, 40′, and to the flowmeter, 1, and then to the reservoir, 31. If arterial blood oxygen saturation is measured, it is manually shunted from the cuvette, 51, to the reservoir, 31. The blood in the reservoir, 31, serves as a continual source of blood for the oxygenator, 32.

A total of 180 ml. of blood perfusate is adequate volume for this apparatus. Zero time is recorded once flow of perfusate begins through the liver, 30. Both stopcocks, 40 and 40′, are positioned manually so that arterial blood oxygen saturation is read, and then, the switches are turned so that venous blood flows through the cuvette. The venous oxygen saturation is then read. Total flow, venous and arterial oxygen saturations are recorded every 30 minutes thereafter throughout the experiment.

Knowing the following factors, the oxygen uptake or consumption of the liver under perfusion can be calculated for any period of time. These factors are: (a) Oxygen saturation of arterial blood, (b) Oxygen saturation of venous blood, (c) Volume of blood that passed through the liver, and (d) Hemoglobin concentration of the perfusate.

From the total flow in milliliters and the hemoglobin concentration the grams of hemoglobin that have passed through the liver per unit time can be determined. The difference in the arterial oxygen saturation and the venous oxygen saturation that exists over the time period allows the calculation of that amount of oxyhemoglobin utilized by the liver. On the basis that one gram of hemoglobin combines with and releases 59 $\mu$moles of oxygen, the total oxygen consumption of the liver can be calculated for a period of time.

The calculation may be summarized according to the following formula:

Oxygen consumption, $\mu$moles $O_2$ $$= \frac{\text{Flow, ml.} \times \text{blood hemoglobin concentron in grams percent}}{100}$$

$$\times \frac{\text{arterial } O_2 \text{ saturation, percent} - \text{venous } O_2 \text{ saturation, percent}}{100} \times 59$$

Using the above described instrumentation in control experiments in which the perfusate consisted of whole rat blood diluted with an equal volume of Tyrodes solution, the isolated rat liver consumed an average of 2.5 $\mu$moles of oxygen per gram of liver per minute.

We claim:
1. In a system for measuring the blood oxygen consumption of a perfused organ the improvement comprising a continuous flow, dual channel flowmeter for measuring the flow of blood through the system, said flowmeter including:
   (a) a pair of columns of a preselected volume each having an inlet and an outlet, said columns alternately filling and emptying through their respective inlets and outlets;
   (b) a metering chamber having a supply inlet and a pair of outlets one of said outlets connected to the inlet of one of said columns and a second of said outlets connected to the inlet of the second of said columns;
   (c) electro-optical column switching means actuated by variations of volume of fluid in said metering chamber for simultaneously controlling the connection of said inlets and outlets to their respective columns for alternate filling and emptying of said columns; and
   (d) a counter responsive to said switching means for recording, consecutively, the number of times said switching means switches the flow from one column to the other over a preselected period of time.
2. The flowmeter of claim 1 wherein said switching means includes:
   (a) a U-shaped trap connected at an end thereof to the upper portion of said chamber said trap containing a liquid;
   (b) an opaque float buoyed up by the liquid contained within said trap and disposed adjacent an end of said trap opposite that connected to said chamber;
   (c) a photo-electric cell having a light source and surrounding the trap at the end opposite that connected to said chamber, describing an optical path through said trap, said cell positioned a predetermined distance above said float when said chamber is empty so that as said chamber fills and pressure increases within said chamber said pressure acts on the liquid in said trap to cause said float to rise in said trap and interrupt said photo-electric cell as said float blocks the optical path of said light source; and
   (d) switching valve means responsive to the interruption of the optical path between said cell and said light source, said switching valve means controlling the filling and emptying of said columns.

3. A continuous flow, dual channel flowmeter comprising:
   (a) a first channel and a second channel, each of said channels including a hollow column having an inlet and an outlet;
   (b) a hollow metering chamber having an inlet and a first and a second outlet in the lower portion thereof, said first outlet communicating with the inlet of said first column and the second outlet communicating with the inlet of said second column;
   (c) a U-shaped trap communicating with the upper portion of said metering chamber at an end thereof;
   (d) a photoelectric cell disposed adjacent the end of said trap opposite the end in communication with said metering chamber;
   (e) a light source disposed at the end of said trap opposite the end in communication with said metering chamber and forming an optical path through said trap with said photocell;
   (f) means disposed within said trap for interrupting the optical path between said cell and said light source responsive to a predetermined pressure within said metering chamber; and
   (g) a first and a second switching valve, responsive to the interruption of the optical path between said cell and said light source, said first valve controlling the flow into said first column and out of said second column, said second valve controlling the flow out of said first column and into said second column, said first valve being maintained normally in an open position when said second valve is maintained in a closed position, said valves reversing positions responsive to the interruption of said optical path.

4. The flowmeter of claim 3 wherein the means for interrupting the optical path between the light source and the photoelectric cell comprises:
   (a) a liquid disposed within said trap; and
   (b) an opaque float bouyed up by said liquid and disposed within said trap at the end opposite the end in communication with said metering chamber and a preselected distance below said optical path so that as the pressure increases in said metering chamber said liquid is urged through said trap causing said float to rise and block said optical path.

5. The flowmeter of claim 4 further comprising an air lock in said trap separating the liquid in said trap from said chamber so that as a flow enters said metering chamber the air in said lock is compressed urging the liquid in said trap through said trap.

6. The flowmeter of claim 3 further comprising:
   (a) a first solenoid operably controlling said first valve, and a second solenoid operably controlling said second valve, said first solenoid normally energized when said second solenoid is de-energized; and
   (b) a racket impulse relay controlling said solenoids responsive to said photoelectric cell so that when said light source to said cell is interrupted said relay acts through said solenoids to cause a simultaneous reversal of the operation of said valves.

7. The flowmeter of claim 6 further comprising a count register operating responsive to each interruption of the optical path between said light source and said photoelectric cell to advance and register the number of times in a preselected period of time that the relay reverses operation of said valves.

References Cited

UNITED STATES PATENTS

| | | | |
|---|---|---|---|
| 2,505,905 | 5/1950 | McAfee | 73—223 |
| 3,094,871 | 6/1963 | Smith | 73—221 |

JAMES J. GILL, Primary Examiner